Jan. 12, 1943.   J. R. DRUMMOND ET AL   2,308,159
DEFECT DETECTOR FOR TUBES
Filed Feb. 28, 1941   3 Sheets-Sheet 1
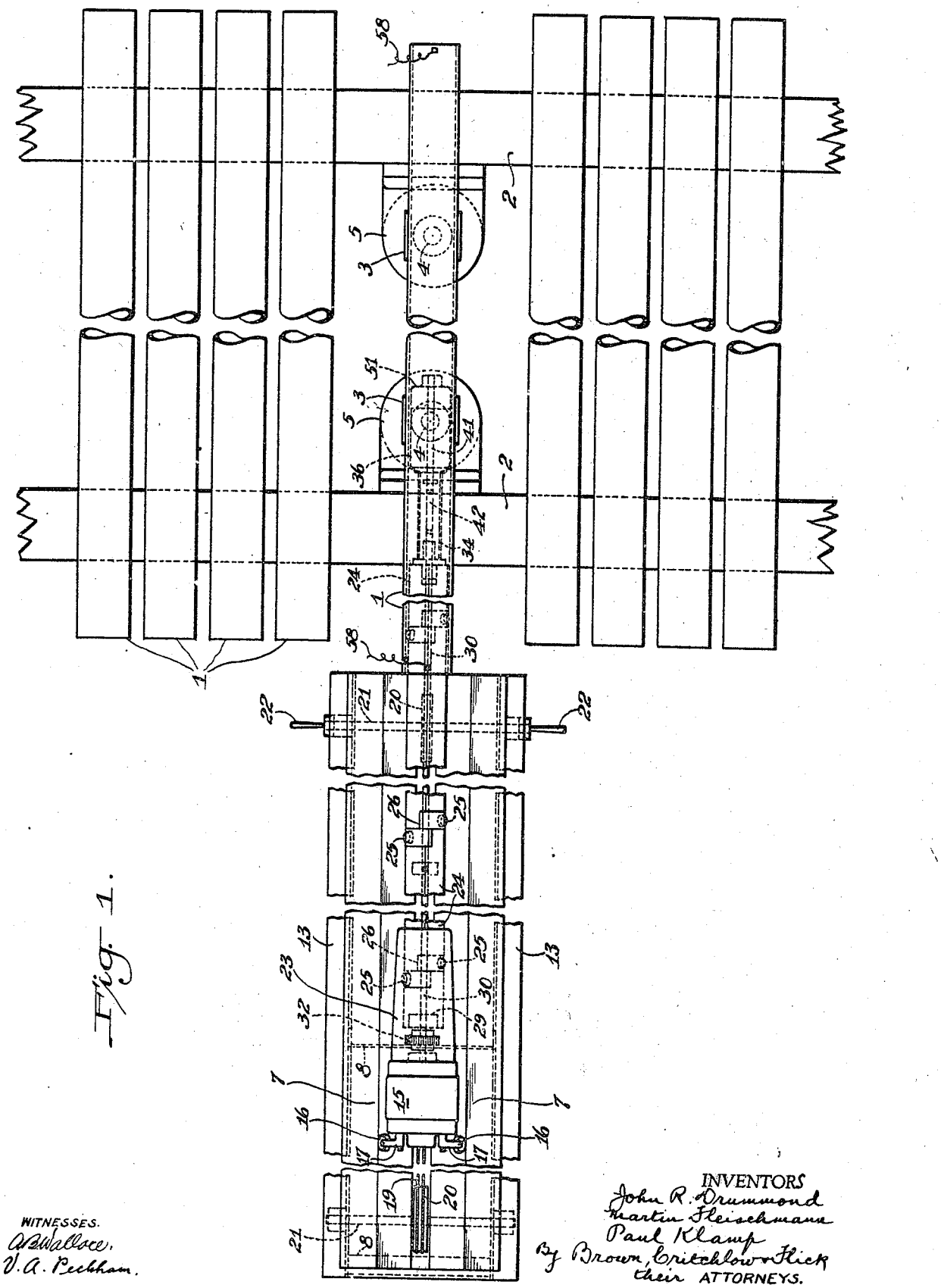

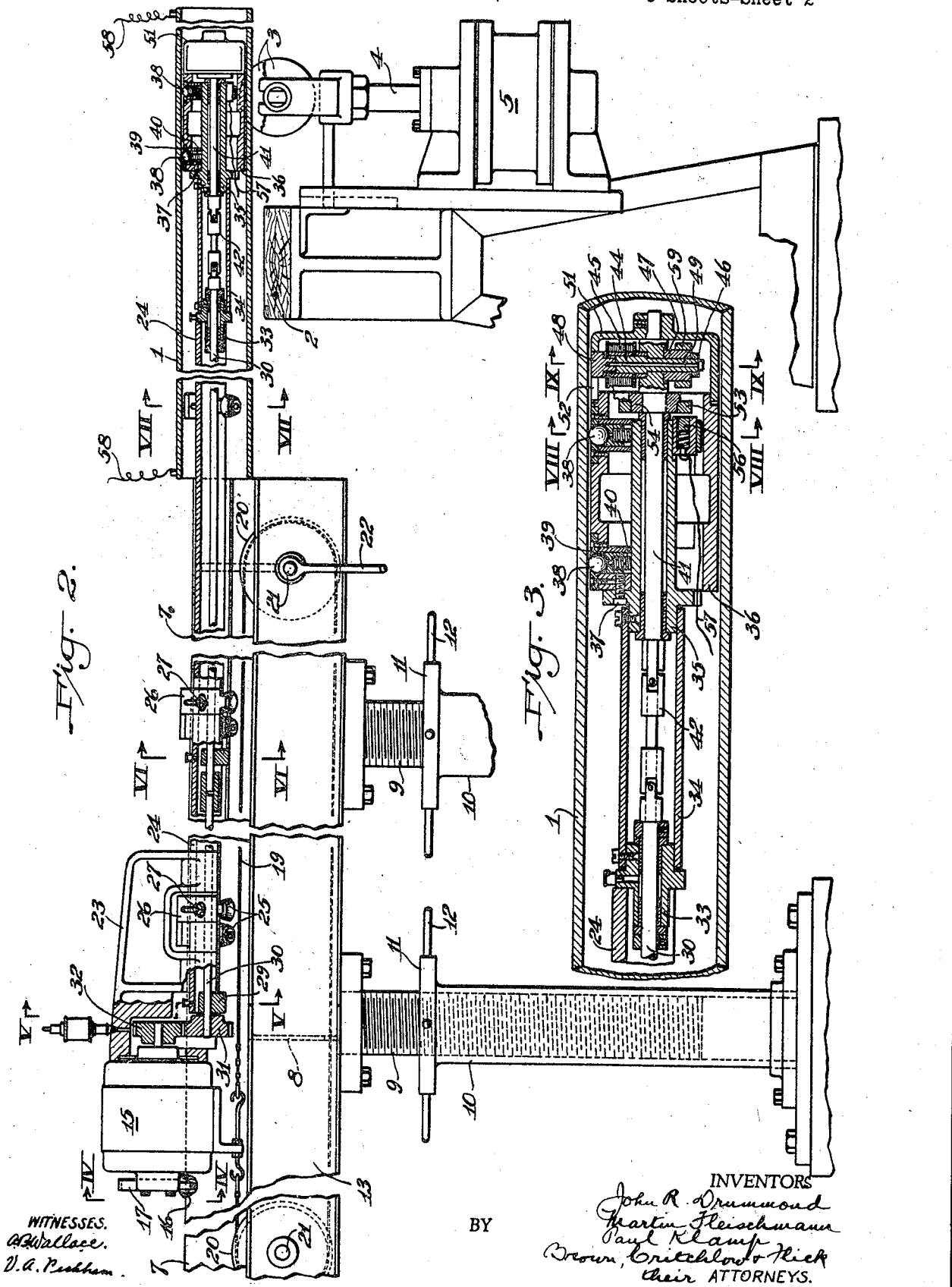

Jan. 12, 1943.　　J. R. DRUMMOND ET AL　　2,308,159
DEFECT DETECTOR FOR TUBES
Filed Feb. 28, 1941　　3 Sheets—Sheet 3
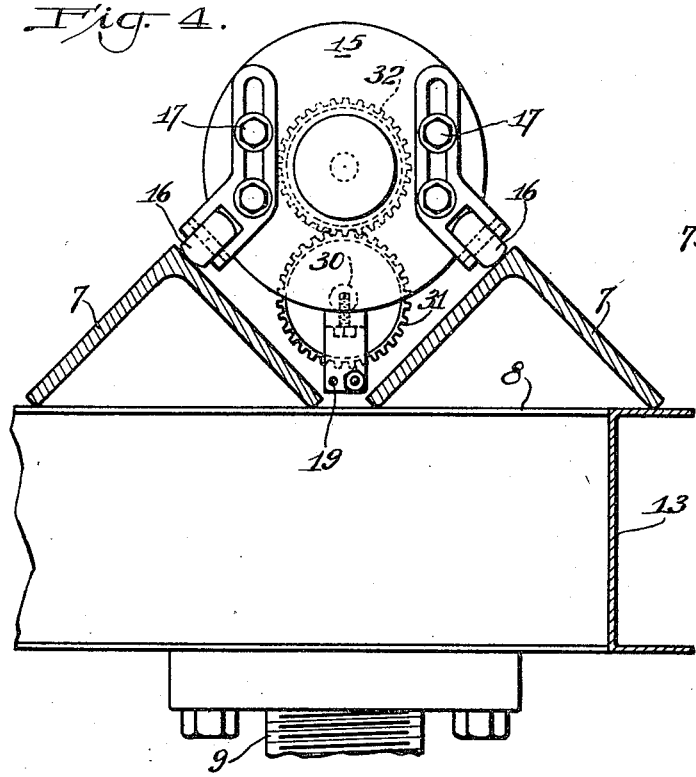
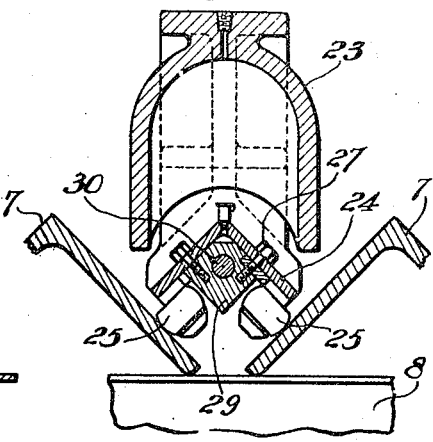
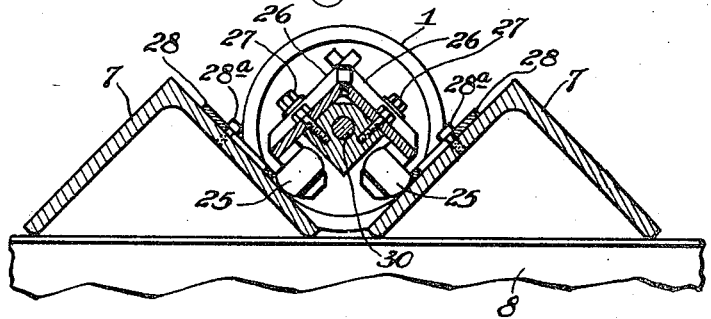
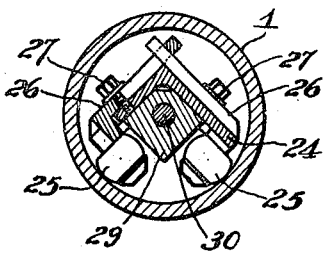
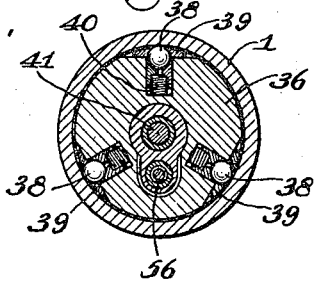
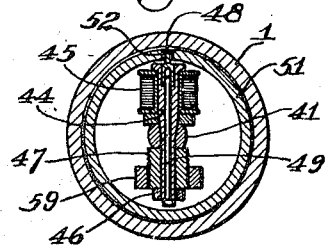
INVENTORS
John R. Drummond
Martin Fleischman
Paul Klamp
Brown, Critchlow & Hick
their ATTORNEYS.
WITNESSES.
A.B.Wallace.
V.A.Peckham.

Patented Jan. 12, 1943

2,308,159

UNITED STATES PATENT OFFICE 2,308,159

DEFECT DETECTOR FOR TUBES

John R. Drummond and Martin Fleischmann, Canton, and Paul Klamp, East Canton, Ohio, assignors to The Timken Roller Bearing Company, Canton, Ohio, a corporation of Ohio Application February 28, 1941, Serial No. 381,086

16 Claims. (Cl. 175—183)

This invention relates to the testing of metal tubes to locate discontinuations in the metal thereof, generally referred to herein as cracks.

In the manufacture of tubing it is extremely difficult to entirely avoid occasional discontinuations in the metal of the tube wall. For instance, cracks or fissures may be formed as by rupture of the tubes or by the failure of folds to reweld to the bodies of the tubes in the drawing operation. In the case of alloys, segregations and the like may cause non-uniformity in the product. Sometimes non-metallic inclusions, such as slag, oxide, dirt, etc., cause discontinuations in the metal. Various ways have been proposed to detect these defects, but simple, yet satisfactory, apparatus for detecting cracks inside a metal tube as well as outside has been lacking.

It is among the objects of this invention to provide apparatus for detecting cracks in metal tubes which is relatively simple in construction but highly efficient in operation.

In accordance with this invention a metal tube that is to be tested is provided in any suitable manner with magnetic lines of flux circling around the axis of the tube. A magnetic coil is then inserted in one end of the tube and means is provided for effecting relative helical movement between the coil and tube so that the tube is traversed by the coil from end to end. Preferably, the tube is held stationary and the coil is moved through it and rotated around the axis of the tube at the same time. A core in the coil projects into close proximity to the inner surface of the tube as the coil rotates therein, and means is electrically connected to the coil for indicating the presence of electric current induced in the coil when its core passes a crack in the tube, whether that crack be within the tube wall or in its inner or outer surface. That is, each discontinuity in the metal of the tube produces a change at that point in the smooth magnetic field and thereby causes an electric current to be induced in the coil, which is shown by any suitable current indicating device, such as a cathode ray oscilloscope.

The preferred embodiment of the invention is illustrated in the accompanying drawings, in which Fig. 1 is a plan view, broken at intervals, of our apparatus; Fig. 2 is an enlarged side view, partly in section and also broken at intervals; Fig. 3 is an enlarged vertical section through the detector head and encircling tube; Figs. 4, 5, 6, 7 are enlarged vertical sections taken on the lines IV—IV, V—V, VI—VI, VII—VII, respectively, of Fig. 2; and Figs. 8 and 9 are enlarged vertical sections taken on the lines VIII—VIII and IX—IX, respectively, of Fig. 3.

Referring to Figs. 1 and 2, tubes 1 to be examined for discontinuations in metal are deposited by a crane or the like on a rack having spaced horizontal supporting members 2 between which there is a pair of aligned concave rollers 3. Each roller is mounted on the upper end of a piston 4 disposed in a fluid pressure cylinder 5 so that the rollers can be retracted below the supporting members and raised above them at will. One of the features of this invention is that, disposed in alignment with these rollers at one side of the rack, there is a track formed from a pair of parallel horizontal angle irons 7 mounted on cross ties 8 which are rigidly supported on the upper ends of threaded posts 9 that extend down into hollow unthreaded posts 10 mounted on a suitable foundation. A nut 11 is threaded on each threaded post and rests loosely on the upper end of the adjoining hollow post, so that when the nut is turned by its handles 12 the rails are raised or lowered for a purpose to be described later. The ends of cross ties 8 are connected by channels 13, and the angle iron rails are mounted with the edges of their flange down so that the adjacent flanges of the two rails are disposed substantially at right angles to each other, as shown in Fig. 4.

Mounted for travel along the rails is an electric motor 15 the rear end of which is supported above the track by means of rollers 16 (Fig. 4) rotatably mounted on the lower ends of vertically adjustable legs 17 secured to the rear of the motor. The front end of the motor is supported above the track in a similar manner as will be described presently. This motor is moved back and forth along the rails by means of an endless cable 19 attached to the bottom of the motor and extending between the two rails and through openings in cross ties 8. The cable is supported by pulleys 20 mounted on shafts 21 journaled in side channels 13 at the opposite ends of the track. One of these shafts is provided with cranks 22 for turning the adjoining pulley in order to pull the cable and thereby move the motor along the track.

Projecting forward from the front of the motor, in accordance with this invention, is a bracket 23 to the bottom of which is clamped the rear end of a horizontal arm 24 in the form of an angle iron that extends forward from the bracket a considerable distance. Beneath the bracket and at other points along the length of this arm the latter is supported by rollers 25 rotatably mounted on the lower ends of slotted plate-like legs 26 lying against the inclined sides of the arm and adjustably connected thereto by screws 27 (Figs. 1, 2, 5, 6 and 7). The arm is notched to permit it to be lowered down over the rollers. As shown in Fig. 6, arm 24 is prevented from tilting laterally on the rails by means of long plates 28 lying against the inclined track surfaces and rollers 25 and provided at intervals with transverse slots through which screws 28a extend for adjustably securing the plates to the rails.

Rigidly connected to the lower surface of the arm at spaced intervals along its length are bearings 29 in which a shaft 30 is rotatably mounted. This shaft is driven from its rear end by a gear 31 which meshes with a gear 32 mounted on the motor shaft. As shown in Fig. 3, loosely connected to a bearing 33 at the front end of the arm there is a forwardly extending short tubular member 34 the front end of which is loosely connected to a sleeve bearing 35 on which a metal barrel 36 is rigidly mounted by screws 37. The barrel is provided near each end with a plurality of radial recesses in each of which a ball 38 is held by a retaining ring 39 (Figs. 3 and 8). The balls are pressed outwardly by coil springs 40 into contact with the wall of tube 1 for centering the barrel therein and to form an antifriction bearing for the barrel. A short shaft 41 is journaled in sleeve bearing 35 with its rear end joined by a universal coupling 42 in short tubular member 34 to the front end of the main drive shaft 30.

As shown in Figs. 3 and 9, another feature of this invention is that the front end of short shaft 41 is provided with a transverse bore through which extends a hollow magnet core 44 having one projecting end encircled by a magnetic coil 45 of wire. The coil and core are held in place by a nut 46 threaded on the core and bearing against counterweight 47 also mounted on the core. The magnet end of the core is provided with an extension or blade 48 that extends into close proximity with the wall of tube 1, and which is held in place by a long screw 49 extending through the hollow core. This blade is protected by a cup-shaped cap 51 of non-magnetic material that is attached to the front end of short shaft 41 and extends rearwardly over the magnetic coil. This cap is provided with a slot 52 into which the core blade projects. One terminal of the coil is grounded to the supporting apparatus and the other end is connected to a collector ring 53 rigidly mounted on a fibre ring 54 securely mounted on shaft 41. The collector ring rotates in engagement with a spring-pressed electric contact member 56 mounted in a lateral extension of sleeve bearing 35. The various elements described above which are thus associated with the front end of tubular member 34 form the detector head of this apparatus. Contact member 56 is connected by a wire 57 to a current indicating device (not shown), such as a cathode ray oscilloscope, so that when the rotating core blade 48 of the coil passes a crack in the tube the electric current induced in the coil at that moment causes the indicator to be actuated and thereby show the presence of the discontinuation in metal.

In using this apparatus a tube 1 is rolled along rack supports 2 until it is directly above lowered concave rollers 3 which are then raised to lift the tube from the supports. The tube is then moved lengthwise on the rollers until it engages the end of track rails 7 (Figs. 1 and 2) which have been raised or lowered so that their adjacent inclined surfaces will be tangent to the inner surface of the tube (Fig. 6). At this time motor 15 is at the rear end of the track so that the detector head will not project from the front end of the track. A closed magnetic field circling around the tube axis is formed in the tube wall in one of several ways. For example, a suitable electric current of high amperage may be supplied to the tube through wires 58 connected to the opposite ends of the tube. This current may be continuous or, if the tube metal is of a character that will retain sufficient magnetism, the current need be applied only for a moment. The desired magnetic flux may also be produced by encircling the tube with a toroidal coil that is movable along the tube from end to end. The apparatus is now ready to start functioning.

Motor 15 is energized so as to rotate coil 45 around the axis of the tube, and cranks 22 are turned in order to cause cable 19 to slowly pull the motor forward on the track and thereby push the detector head into and through the tube. The magnetic coil and core blade 48 thus describe a helical path as they travel through the tube. If there is a discontinuation of metal in the tube wall a disturbance is produced in the smooth magnetic field in the tube, and the magnetic flux lines that are thereby deformed induce in the coil an electric current the presence of which is immediately indicated by the current indicating device electrically connected to the coil.

In case it is desired to test a larger tube, barrel 36 is removed from sleeve bearing 35 by loosening screws 37, and a larger barrel of appropriate size is substituted for it. Likewise, a longer core blade 48 and a larger protective cap 51 are substituted for those illustrated. To counterbalance core blades of various lengths, auxiliary nut-like counterweights 59 are threaded on main counterweight 47 along which they can be moved. Rollers 16 and 25 by which the motor and arm 24 are supported are moved downwardly relative to the motor and arm by adjusting legs 17 and 26, whereby the motor and arm are raised farther above the track so that shaft 30 will be substantially coaxial with the larger tube.

According to the provisions of the patent statutes, we have explained the principle and method of practicing our invention and have illustrated and described what we now consider to represent its best embodiments. However, we desire to have it understood that, within the scope of the appended claims, the invention may be practiced otherwise than as specifically illustrated and described.

We claim:

1. A crack detector for metal tubes, comprising a magnetic coil adapted to be inserted in a metal tube in the wall of which there is a closed magnetic field, means for effecting relative helical movement between the coil and tube whereby the tube is traversed from end to end by the coil, a core in the coil projecting transversely of the tube into close proximity to the inner surface of the tube, and means for electrically connecting said coil to current-indicating means for indicating electric current induced in the coil when its core passes a discontinuation in the metal of the tube.

2. A crack detector for metal tubes, comprising a magnetic coil adapted to be moved through a metal tube in the wall of which there is a closed magnetic field, means for moving the coil through the tube and for rotating it around the axis of the tube as it travels therethrough, a core in the coil projecting into close proximity to the inner surface of the tube, and means for electrically connecting said coil to current-indicating means for indicating electric current induced in the coil when its core passes a discontinuity in the metal of the tube.

3. A crack detector for metal tubes, comprising a magnetic coil adapted to be inserted in a metal tube in the wall of which there is a closed magnetic field, a motor for rotating the coil continuously around the axis of the tube, means for moving the motor ahead to thereby move the coil through the tube, a core in the coil projecting transversely of the tube into close proximity to the inner surface of the tube, and means for electrically connecting said coil to current-indicating means for indicating electric current induced in the coil when its core passes a discontinuation in the metal of the tube.

4. A crack detector for metal tubes, comprising a magnetic coil adapted to be inserted in a metal tube in the wall of which there is a closed magnetic field, means for effecting relative helical movement between the coil and tube, a core in the coil provided with an extension projecting into close proximity to the inner surface of the tube, a protective member provided with an opening into which said core extension projects, and means for electrically connecting said coil to current-indicating means for indicating electric current induced in the coil when its core passes a discontinuation in the metal of the tube.

5. A crack detector for metal tubes, comprising a magnetic coil adapted to be inserted in a metal tube in the wall of which there is a closed magnetic field, means for moving the coil in a helical path through the tube, a core in the coil projecting transversely of the tube into close proximity to the inner surface of the tube, means for spacing the coil a uniform distance from the inner surface of the tube, and means for electrically connecting said coil to current-indicating means for indicating electric current induced in the coil when its core passes a discontinuation in the metal of the tube.

6. A crack detector for metal tubes, comprising a magnetic coil adapted to be inserted in a metal tube in the wall of which there is a closed magnetic field, an electric motor, elongated means connected at its ends to the motor and coil, means for moving the motor ahead to thereby move the coil through the tube, a shaft supported by said elongated means and driven by the motor for rotating the coil around the axis of the tube, a core in the coil projecting radially of the tube into close proximity to the inner surface of the tube, and means for electrically connecting said coil to current-indicating means for indicating electric current induced in the coil when its core passes a discontinuation in the metal of the tube.

7. A crack detector for metal tubes, comprising a magnetic coil adapted to be inserted in a metal tube in the wall of which there is a closed magnetic field, an electric motor, an arm connected at one end to the motor, means adjacent said coil for engaging the inner surface of the tube to guide the coil therein, means for loosely connecting said tube-engaging means to the front end of said arm, means for moving the motor ahead to thereby move the coil through the tube, a shaft rotatably supported by said arm and driven by the motor, a universal coupling connecting the front end of the shaft to said coil, a core in the coil projecting into close proximity to the inner surface of the tube, and means for electrically connecting said coil to current-indicating means for indicating electric current induced in the coil when its core passes a discontinuation in the metal of the tube.

8. A crack detector for metal tubes, comprising a magnetic coil adapted to be inserted in a metal tube in the wall of which there is a closed magnetic field, an electric motor, an arm connected at its ends to the motor and coil, a track adapted to be aligned with the tube and to substantially engage one end thereof, rotatable members adjustably supporting said motor and arm and adapted to travel along the track and into the tube, means for moving the motor ahead to thereby move the coil through the tube, a shaft supported by said arm and driven by the motor for rotating the coil, a core in the coil projecting into close proximity to the inner surface of the tube, and means for electrically connecting said coil to current-indicating means for indicating electric current induced in the coil when its core passes a discontinuation in the metal of the tube.

9. A crack detector for metal tubes, comprising a magnetic coil adapted to be inserted in a metal tube in the wall of which there is a closed magnetic field, an electric motor, an arm connected at its ends to the motor and coil, a pair of upwardly diverging track surfaces adapted to be aligned with the tube and to be disposed tangent to the inner surface thereof, rotatable members adjustably supporting said motor and arm and adapted to travel along the track and the tube, means for moving the motor ahead to thereby move the coil through the tube, a shaft supported by said arm and driven by the motor for rotating the coil, a core in the coil projecting into close proximity to the inner surface of the tube, and means for electrically connecting said coil to current-indicating means for indicating electric current induced in the coil when its core passes a discontinuation in the wall of the tube.

10. A crack detector for metal tubes, comprising a magnetic coil adapted to be moved through a metal tube in the wall of which there is a closed magnetic field, a coil supporting member adapted to be inserted in said tube and provided with a plurality of radial recesses, spring pressed rotatable elements disposed in said recesses for spacing said member from the wall of the tube, said member being provided with an axial passage therethrough, a shaft rotatably mounted in said passage and rigidly connected at one end to said coil, means connected to the opposite end of said shaft for rotating it, means for moving said member and coil through the tube, a core in the coil projecting into close proximity to the inner surface of the tube, and means for electrically connecting said coil to current-indicating means for indicating electric current induced in the coil when its core passes a discontinuation in the wall of the tube.

11. A crack detector for metal tubes, comprising a magnetic coil adapted to be moved through a metal tube in the wall of which there is a closed magnetic field, a shaft adapted to be inserted in said tube concentrically therewith, means connecting said coil to one side of the shaft, a counterweight connected to the opposite side of the shaft, means connected to the opposite end of the shaft for rotating it, means for moving said shaft and coil through the tube, a core in the coil projecting into close proximity to the inner surface of the tube, and means for electrically connecting said coil to current-indicating means for indicating electric current induced in the coil when its core passes a discontinuity in the wall of the tube.

12. A crack detector for metal tubes, comprising a magnetic coil adapted to be moved through a metal tube in the wall of which there is a closed magnetic field, a coil supporting member adapted to be inserted in said tube and provided with a plurality of radial recesses, spring pressed rotatable elements disposed in said recesses for spacing said member from the wall of the tube, said member being provided with an axial passage therethrough, a shaft rotatably mounted in said passage and rigidly connected at one end to said coil, means connected to the opposite end of said shaft for rotating it, means for moving said member and coil through the tube, a collector ring rigidly mounted on said shaft and electrically connected to the coil, an electric contact member associated with said supporting member and engaging said ring, a core in the coil projecting into close proximity to the inner surface of the tube, and means for electrically connecting said contact member to current-indicating means for indicating electric current induced in the coil when its core passes a discontinuity in the wall of the tube.

13. A crack detector for metal tubes, comprising a magnetic coil adapted to be inserted in a metal tube in the wall of which there is a closed magnetic field, means for effecting relative helical movement between the coil and tube whereby the tube is traversed from end to end by the coil, a core in the coil, an extension for said core projecting into close proximity to the inner surface of the tube, means for detachably connecting said extension to the core, and means for electrically connecting said coil to current-indicating means for indicating electric current induced in the coil when its core passes a discontinuity in the wall of the tube.

14. A crack detector for metal tubes, comprising a magnetic coil adapted to be inserted in a metal tube in the wall of which there is a closed magnetic field, an electric motor, an arm connected at its rear end to the motor, a bearing connected to the front end of the arm, a tube-engaging member detachably mounted on said bearing, a shaft journaled in said bearing and driven from its rear end by said motor, means for connecting said coil to the front end of said shaft, a core in the coil projecting into close proximity to the inner surface of the tube, and means for electrically connecting said coil to current-indicating means for indicating electric current induced in the coil when its core passes a discontinuity in the wall of the tube.

15. A crack detector for metal tubes, comprising a magnetic coil adapted to be inserted in a metal tube in the wall of which there is a closed magnetic field, an electric motor, an arm connected at its rear end to the motor, a bearing connected to the front end of the arm, a tube-engaging member detachably mounted on said bearing, a shaft journaled in said bearing and driven from its rear end by said motor, means for connecting said coil to the front end of said shaft, a core in the coil projecting into close proximity to the inner surface of the tube, a protective cap secured to the front end of said shaft and surrounding said coil, said cap being provided with a slot receiving the outer end of said core, and means for electrically connecting said coil to current-indicating means for indicating electric current induced in the coil when its core passes a discontinuity in the wall of the tube.

16. A crack detector for metal tubes, comprising a magnetic coil adapted to be inserted in a metal tube in the wall of which there is a closed magnetic field, an electric motor, an arm connected at its ends to the motor and coil, a pair of upwardly diverging track surfaces adapted to be aligned with the tube and to be disposed tangent to the inner surface thereof, a support for said track surfaces, means for raising and lowering said support, an endless cable attached to said motor, means journaled in said support for supporting said cable, means for actuating said cable-supporting means to pull the motor along the track, a shaft supported by said arm and driven by the motor for rotating the coil, a core in the coil projecting into close proximity to the inner surface of the tube, and means for electrically connecting said coil to current-indicating means for indicating electric current induced in the coil when its core passes a discontinuation in the wall of the tube.

JOHN R. DRUMMOND.
MARTIN FLEISCHMANN.
PAUL KLAMP.